United States Patent [19]
McCall et al.

[11] Patent Number: 5,208,893
[45] Date of Patent: May 4, 1993

[54] OPTICAL FIBER SPLICE TRAY AND SPLICE HOLDER

[75] Inventors: Mark McCall, San Jose; Thomas Wong, Menlo Park; Marc F. Moisson, San Carlos, all of Calif.

[73] Assignee: Raynet Corporation, Menlo Park, Calif.

[21] Appl. No.: 887,432

[22] Filed: May 21, 1992

[51] Int. Cl.⁵ .......................... G02B 6/00; G02B 6/36
[52] U.S. Cl. .................................................. 385/135
[58] Field of Search ................................. 385/134–137

[56] References Cited

U.S. PATENT DOCUMENTS

| | | | |
|---|---|---|---|
| 4,359,262 | 11/1982 | Dolan | 350/96.2 |
| 4,489,830 | 12/1984 | Charlebois et al. | 206/316 |
| 4,627,686 | 12/1986 | Szentesi | 350/96.2 |
| 4,679,896 | 7/1987 | Krafcik et al. | 350/96.2 |
| 4,687,289 | 8/1987 | DeSanti | 350/96.2 |
| 4,913,522 | 4/1990 | Nolf et al. | 350/96.2 |

Primary Examiner—Akm E. Ullah
Attorney, Agent, or Firm—Dennis E. Kovach

[57] ABSTRACT

An optical fiber splice tube holder includes a plurality of torsion bars and cantilever bars which provide a resilient retaining force for an optical fiber splice container to be retained therein. The use of torsion bars helps distribute stress generated by a spring force of the fiber splice member holder about a large amount of material so as to achieve an efficient spring construction so that a plurality of splice holders can be accommodated in a reduced space on a fiber storage tray.

11 Claims, 5 Drawing Sheets

OPTICAL FIBER SPLICE TRAY AND SPLICE HOLDER

BACKGROUND OF THE INVENTION

The present invention relates to an optical fiber splice tray, and more particularly to improved optical fiber splice holders for an optical fiber splice tray.

Optical fibers are extensively used in telecommunication systems for transmitting voice, video, and data information. A variety of methods and apparatuses have been proposed for splicing optical fibers. In general, two methods predominate, the first being that of fusing ends of fibers to be connected to one another by heating the fiber ends and melting them together, the second being placing the confronting ends of the fibers being connected into a mechanical holder which aligns the fiber ends mechanically so as to confront one another. Whenever fiber ends are fused together, they are typically encased within an environmental protective structure. This environmental protective structure, in general, is typically cylindrical, and though mechanical splices or mechanical connectors vary widely in construction, their external profile, though it can be cylindrical, is oftentimes elongated in length but noncylindrical. Furthermore, in general, a cross-sectional width or profile of mechanical connectors is generally larger than a cylindrical cross-section of fusion splices, and fusion splices also tend to be longer in length axially than their counterpart mechanical connectors. Accordingly, it is necessary for optical fiber closures having optical fiber organization trays therein to be able to easily accommodate a variety of different sized fiber splice containers so as to allow a craftsperson flexibility in a manner in which he wants to connect or repair fibers whose splices are to be housed in the fiber closure. Typical prior art proposals are disadvantageous since they do not allow for a sufficiently wide variation in fiber splice container size, do not create a sufficient spring force for adequately holding a wide variety of fiber splice container sizes, and require an undue amount of tray real estate for accommodating a plurality of splice holders on a splice tray thus minimizing an efficiency of the splice tray for holding numerous fiber splice containers.

SUMMARY OF THE INVENTION

Accordingly, it is an object of the present invention to eliminate the above-noted drawbacks and to provide an optical fiber splice tray having a plurality of optical fiber splice holders thereon which are more compact in size and exert a higher spring retaining force than prior art proposals.

It is a further object of the invention to provide an optical splice holder which utilizes first and second torsion bars which are capable of more evenly distributing a spring retention stress over a larger amount of tray material than that proposed in prior art splice holders.

These and other objects of the invention are achieved by an optical fiber splice holder, comprising:

first and second separated and elongated torsion bars;

a first member extending outward from the first torsion bar and a second member extending outward from the second torsion bar, the members extending outward along a direction away from a plane interconnecting the first and second torsion bars, the first and second torsion bars and members having a stiffness and resilience and being sized and being oriented such that a variety of different sized optical fiber splice containers can be resiliently retained therebetween.

The invention is further achieved by a splice tray, comprising:

a substrate having a plurality of longitudinal cut out section pairs oriented in-line end-to-end, the pairs being oriented in a stack configuration so as to be substantially parallel to one another so as to form a plurality of separated, elongated and flexible substrate torsion bar pairs, each torsion bar having a flexible cantilever spring member extending outward from a plane of the substrate, each pair of torsion bars and their associated flexible cantilever spring members defining an optical fiber splice container holding section therebetween.

The invention will be better understood by reference to the following drawings and detailed description.

DETAILED DESCRIPTION OF THE PREFERRED EMBODIMENTS

Figure 1:
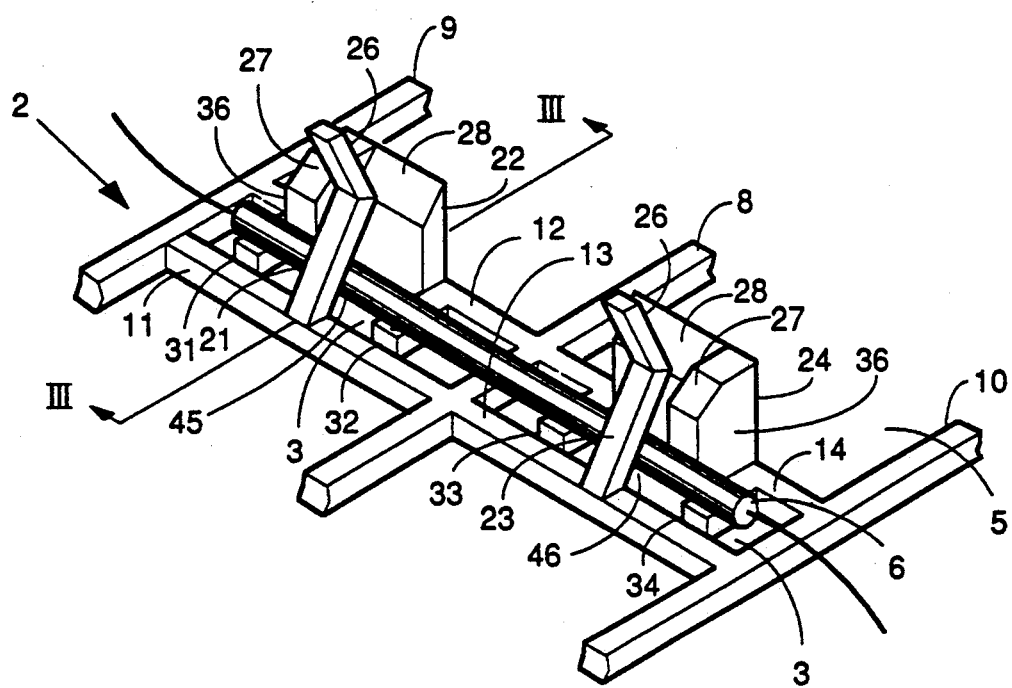
FIG. 1 illustrates a perspective view of a first preferred embodiment of a splice holder according to the invention.
Figure 2:
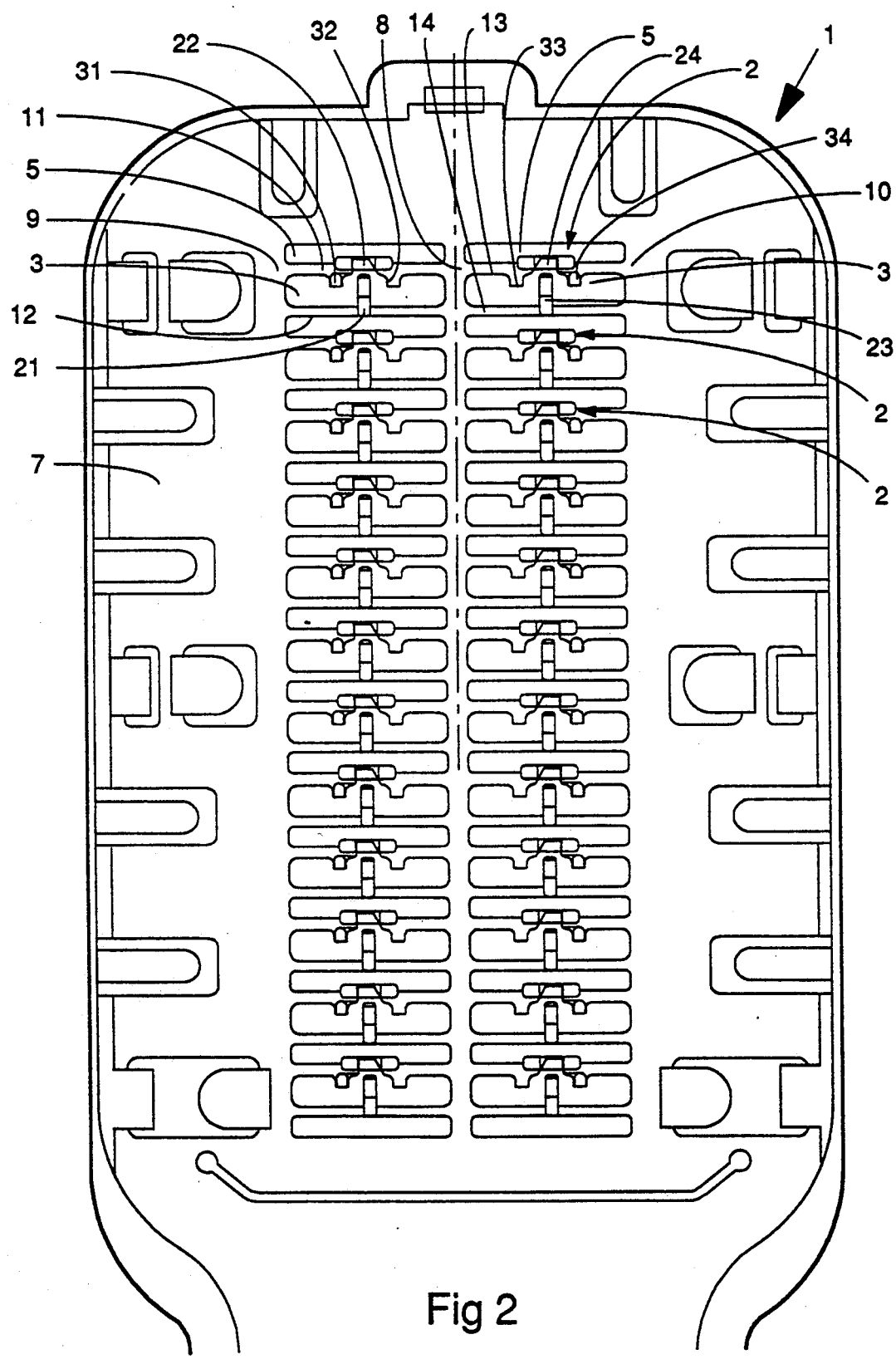
FIG. 2 illustrates a plane view of a splice tray containing a plurality of splice holders of the type illustrated in FIG. 1 therein.

FIG. 2 shows a plan view of a preferred embodiment of the present invention, this figure illustrating an optical fiber splice tray 1 which contains a plurality of adjacent optical fiber splice holders 2 stacked along a direction essentially perpendicular to a longitudinal axis of optical fiber splice containers 6 (FIG.) to be retained thereby. The splice tray 1 includes a splice tray substrate 7 which, in a vicinity of the splice tube holders 2 has a plurality of longitudinal sections 3, 5 cut away so as to form a plurality of torsion bars 11-14. As FIG. 2 illustrates, since the cut away portions 3, 5 are separated by a portion of the substrate 7 identified as reference numeral 8 in the center of the splice tray, the material 8 essentially forms a support member for confronting ends of confronting torsion bars 11, 13 and 12, 14, respectively. Portions of the substrate 7 on opposite extreme ends of the torsion bars, identified as reference numerals 9 and 10, support the remaining ends of the torsion bars. In FIG. 1, though the material 9, 10 is illustrated as being in the shape of a rectangular rod, it should be readily understood that the material 9, 10 can comprise an extended planar substrate, as illustrated in FIG. 2, the invention being equally applicable to either construction.

Substrate 7, and in particular the torsion bars 11-14 is made of a flexible material such as a thermoplastic, a thermoset, an elastomer, or a thermoplastic elastomer, preferred materials being a high density polyethylene or polypropylene, depending on the design requirements. Polyethylene has a disadvantage in that it becomes too soft at high temperature, though polypropylene is preferred if a high temperature, if that happens to be a design requirements.

Figure 3:
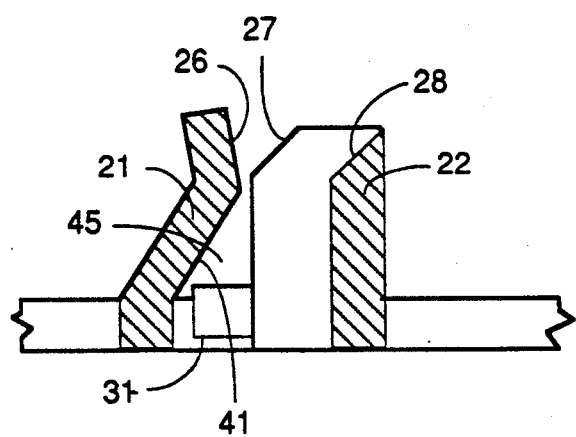
FIG. 3 illustrates a cross-sectional view taken along lines III—III in FIG. 1.

Extending from the torsion bars are first, second, third, and fourth members 21-24 which functionally act as cantilever bars. As FIGS. 1 and 3 more clearly illustrate, the cantilever bars are oriented so as to be grouped in confronting pairs, with one of the confronting cantilever bars 21, 23 having a section 41 angled at about 45° towards its confronting torsion bar 22, 24.

As FIG. 1 illustrates, each pair of confronting cantilever bars form an optical fiber splice member retention section 45, 46, each capable of elastically retaining an end of an optical fiber splice member 6. Furthermore, each cantilever bar has an angled upper end surface 26, 27, 28, the surface 27 angling towards the surface 28 towards a common apex, and the surface 28 also angling towards the surface 26 towards another apex. Accordingly, an optical fiber splice container, to be resiliently held by the splice holder, is inserted into the splice holder by moving the optical fiber splice member downward in a vertical direction, with the surfaces 26-28 acting as guiding surfaces to facilitate optical fiber splice container insertion into the holder.

Cantilever bars 22, 24 each have protruding shoulders 36 at an end thereof which, together with its confronting cantilever bar forms a reduced cross-sectional retention area for an end of a splice container held between the confronting cantilever bars. Accordingly, for the case of fusion splice containers which tend to be longer and thinner in cross-section than mechanical splice containers, ends of the fusion splice member are held securely with sufficient spring retention force since they lie and are held between the cantilever bar members 36 and the confronting cantilever bar members 21, 23, respectively. For the case of mechanical splice containers, which are thicker in cross-section and shorter, they are resiliently held between the cantilever bars 21, 23 and the confronting non-shoulder parts of the cantilever bars 22, 24, with ends of the mechanical splice containers confronting inside planar surfaces of the cantilever bar shoulders 36. Accordingly, the shoulder construction of the cantilever bars 22, 24 enable a wide range of cross-sectional areas of splice members to be retained therein to be accommodated, the cross-sectional area being variable by a factor of 0.2, 0.5, 1.0, 2.0, 3.0, 5.0, or even 10.0 if desired.

A further feature of the invention is the provision of the first, second, third, and fourth dog-ears or extension tabs 31-34. These extension tabs allow an optical fiber splice container to be inserted and removed from the splice holder 2 without causing either end of the splice container to torpedo or protrude an undue distance in a downward direction through the cutout sections 3, 5 which could cause an optical fiber to snap at an end section of the splice container. The provision of four extension tabs is required according to a preferred embodiment which is specifically constructed so as to allow for two distinct longitudinal lengths of splice containers to be accommodated, one for mechanical splice containers and the other for fusion splice containers. The inner extension tabs 32, 33 prevent either end of mechanical splice containers to torpedo, with the outer extension tabs 31, 34 preventing either end of a fusion splice container to torpedo.

According to a preferred embodiment, numerous splice member holders 2 are stacked adjacent to one another as illustrated in FIG. 2, preferably a number of splice holders being in excess of twelve which is a typical number of fibers held in a loose tube so that at least twelve splice members can be retained on a tray in the event that all the fibers in the tube are ever broken and require splicing.

According to the invention, since the spring load from the cantilever bars 21-24 is transferred in part to the torsion bars 11-14, the stress generated by the spring force is distributed over a large amount of material so that locally concentrated high stress areas are avoided. This results in a more efficient structural spring construction and allows repetitive splice holders 2 to be arranged adjacent to one another while utilizing a reduced amount of splice tray real estate. According to a preferred embodiment, the splice tray substrate 7 along with the torsion bars, cantilever bars, and extension tabs are all formed of a common materials in an injection molding process.

Figure 4:
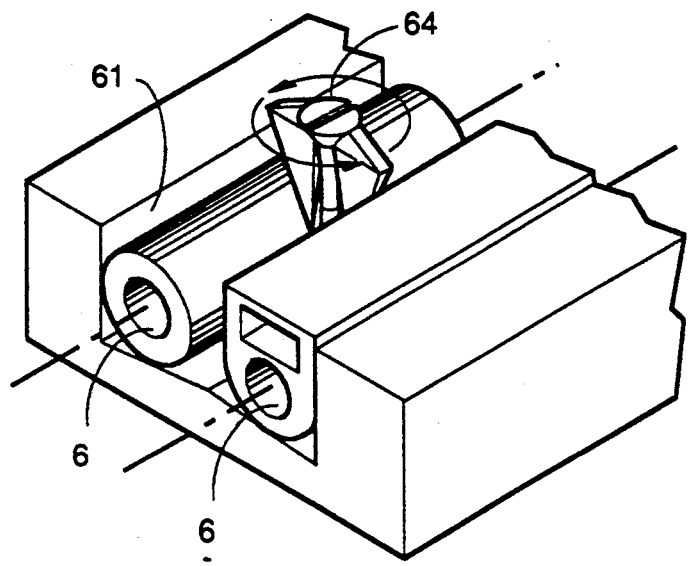
FIGS. 4–6 illustrate a second preferred embodiment of a splice holder according to the invention.
Figure 5:
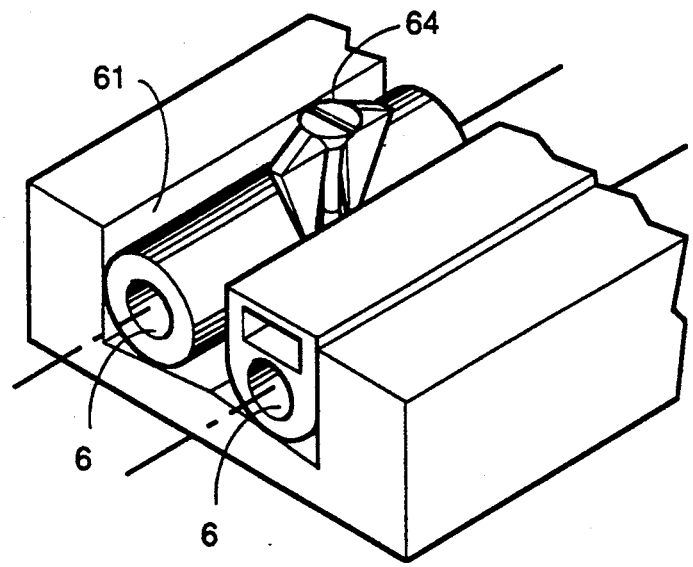
Figure 6:
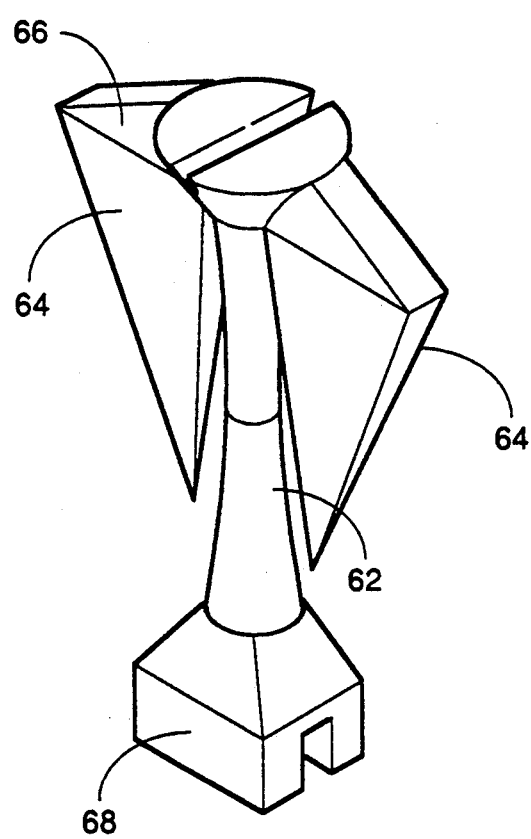

FIGS. 4-6 illustrate another embodiment of the invention whereby a splice holder is formed utilizing a fixed cavity 61 in combination with a splice holder stem 62 having flexible sections 64 extending downward from an upper section of the stem. The upper section of the stem 66 and the flexible sections 64 are rotatable relative to the lower section 68 of the stem so as to allow a means for easily inserting and removing an optical splice container from the splice holder. FIG. 4 illustrates an orientation of the stem 62 when one or more splice members 6 are to be retained within the fixed cavity 61, and FIG. 5 shows an orientation of the stem whereby it has been rotated through an angle of 90° so as to allow easy removal of the splice members 6. According to this construction, since the flexible sections 64 are resilient, splice members having a wide variance in cross-sectional areas can be accommodated.

Though the invention has been described by reference to certain preferred embodiments thereof, the invention is not to be so limited and is to be limited only by the appended claims.

What is claimed is:
1. An optical fiber splice holder, comprising:
   first and second separated and elongated torsion bars;
   a first member extending outward from the first torsion bar and a second member extending outward from the second torsion bar, the members extending outward along a direction away from a plane interconnecting the first and second torsion bars, the first and second torsion bars and members having a stiffness and resilience and being sized and being oriented such that a variety of different sized optical fiber splice containers can be resiliently retained therebetween;
   third and fourth separated and elongated torsion bars, the third torsion bar being in line with the first torsion bar, the fourth torsion bar being in line with the first torsion bar;
   a third member extending outward from the third torsion bar and a fourth member extending outward from the fourth torsion bar, the third and fourth members extending outward along the direction away from the plane interconnecting the torsion bars;
   the first and second torsion bars and first and second members being sized and oriented and having a stiffness and resilience such that one end of a variety of sized optical fiber splice containers can be resiliently retained therebetween, the third and fourth torsion bars and third and fourth members being sized and oriented and having a stiffness and resilience such that an opposite end of the variety of different sized optical fiber splice containers can be resiliently retained therebetween.

2. The splice holder of claim 1, the first and second members comprising first and second cantilever bars.

3. The splice holder of claim 1, the first, second, third, and fourth members comprising first, second, third, and fourth cantilever bars.

4. The splice holder of claim 2, the cantilever bars having end surfaces remote from the first and second torsion bars which angle towards one another downward in a direction toward the plane so as to angle to form a V-shaped guiding means to form a splice member guiding region for assisting a craftsperson for inserting a splice member into the splice holder.

5. The splice holder of claim 1, the first member including a first shoulder extending toward the second torsion bar thereby forming a first splice member retention section between the first shoulder and the second member and a second splice member retention section between a non-shoulder part of the first member and the second member, the third member including a second shoulder extending toward the fourth member thereby forming a third splice member retention section between the shoulder of the third member and the fourth member and a fourth splice member retention section between a non-shoulder part of the third member and the fourth member, the first and third retention sections having a smaller cross-section than the second and fourth retention sections, the second and fourth retention sections being adjacent one another so that a first optical fiber splice container having a length which is shorter and a cross-sectional area which is larger than that of a second optical fiber splice container can be retained within the second and fourth splice member retention sections while the seond splice container having a smaller cross-sectional area and longer length than the first splice container can be retained within the first and third splice member retention sections.

6. The splice holder of claim 1, further comprising at least one lab extending away from one of the torsion bars and toward the other torsion bar in a plane parallel to the plane interconnecting the torsion bars.

7. The splice holder of claim 5, further comprising first, second, third and fourth tabs extending outward from any one of the torsion bars along a direction toward a confronting torsion bar, each of the tabs being located adjacent a different one of the splice member retention sections so as to provide a bottom surface restricting downward movement of either end of a splice container when either of its ends is removed from the splice holder prior to its opposite end.

8. The splice holder of claim 1, the first and second torsion bars being oriented so as to be parallel to one another, the torsion bars being supported at their opposite ends to first and second support members, the first and second torsion bars not being interconnected to each other at areas other than their respective ends.

9. The splice holder of claim 7, further comprising first, second and third support members, the first support member interconnecting confronting ends of the first and third torsion members and second and fourth torsion bars, the second support member interconnecting opposite confronting ends of the first and second torsion bars, the third support member interconnecting opposite ends of the third and fourth torsion bars.

10. A splice tray, comprising:
a substrate having a plurality of longitudinal cut out section pairs oriented in-line end-to-end, the pairs being oriented in a stack configuration so as to be substantially parallel to one another so as to form a plurality of separated, elongated and flexible substrate torsion bar pairs, each torsion bar having a flexible cantilever spring member extending outward from a plane of the substrate, each pair of torsion bars and their associated flexible cantilever spring members defining an optical fiber splice container holding section therebetween.

11. An optical fiber splice holder, comprising:
a substrate forming a fixed cavity;
a stem extending upward from a floor of the cavity, the stem including flexible sections extending downward from an upper section thereof, the upper section and flexible sections of the stem being rotatable about an angle of at least about 90° so that at one angular position of the stem the flexible sections are oriented so as to be substantially in line with a longitudinal axis of a splice container to be retained, to allow insertion or removal of the container into or out of the cavity, a second angular position which is offset from the first position resulting in the flexible members being oriented so as to be substantially perpendicular to the longitudinal axis.

* * * * *